Figure 1:
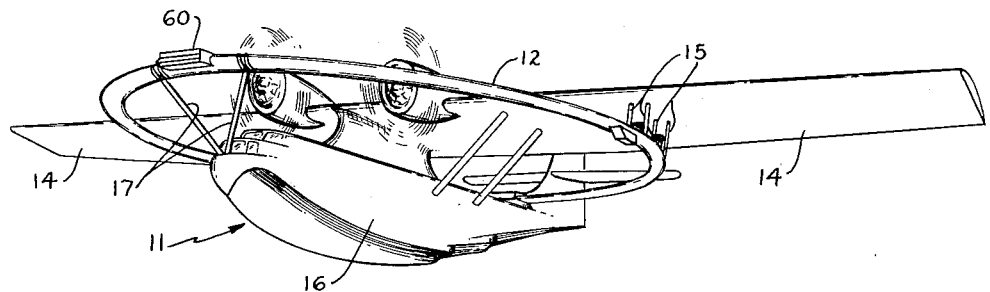

April 17, 1962  R. L. FREAS  3,030,555
ELECTRICAL COIL AND COOLING SYSTEM THEREFOR
Filed June 5, 1950  3 Sheets-Sheet 1

INVENTOR.
RAYMOND L. FREAS
BY
ATTORNEY

April 17, 1962
R. L. FREAS
3,030,555
ELECTRICAL COIL AND COOLING SYSTEM THEREFOR
Filed June 5, 1950
3 Sheets-Sheet 2
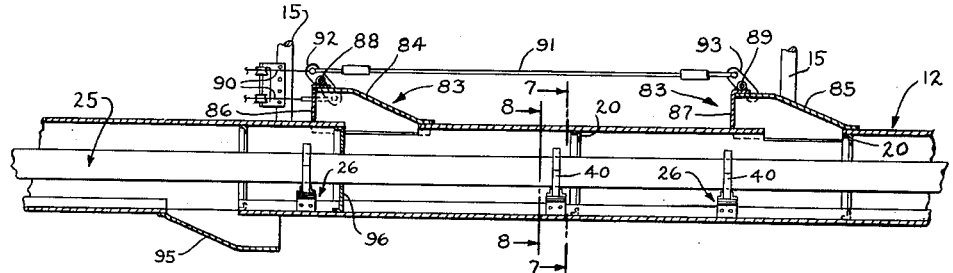
FIG. 3
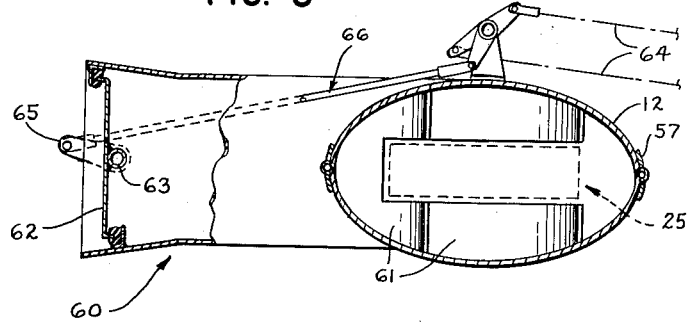
FIG. 4
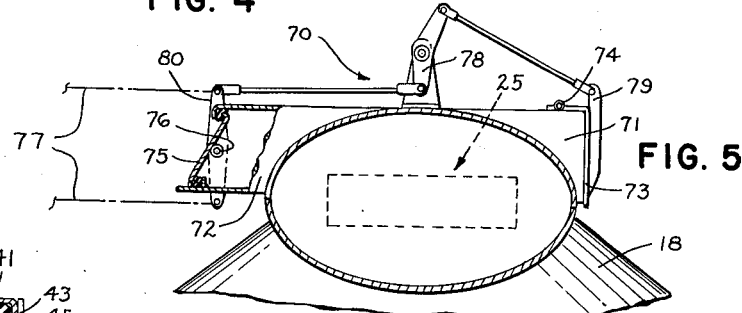
FIG. 5
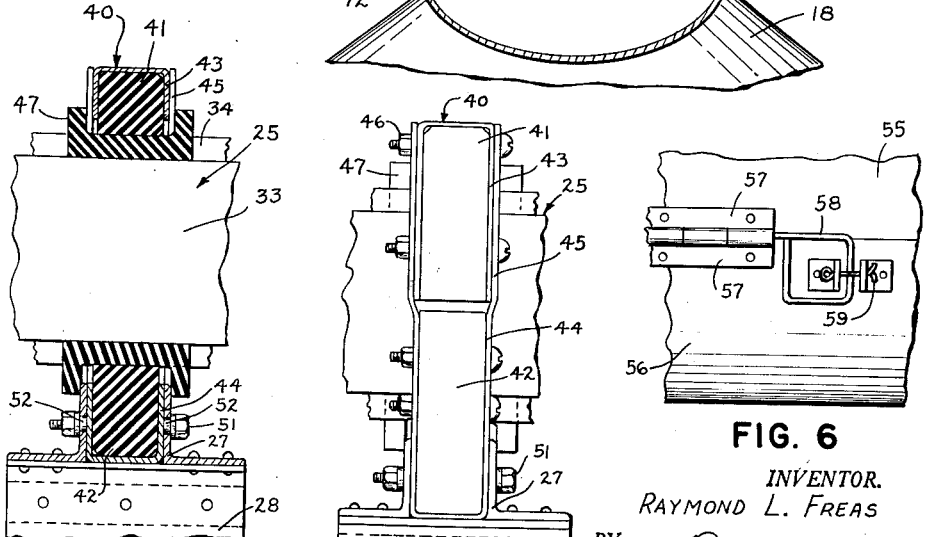
FIG. 9
FIG. 10
FIG. 6
INVENTOR.
RAYMOND L. FREAS
BY
ATTORNEYS April 17, 1962 R. L. FREAS 3,030,555
ELECTRICAL COIL AND COOLING SYSTEM THEREFOR
Filed June 5, 1950 3 Sheets-Sheet 3

INVENTOR.
RAYMOND L. FREAS
BY
ATTORNEYS

United States Patent Office 3,030,555
Patented Apr. 17, 1962

3,030,555
ELECTRICAL COIL AND COOLING
SYSTEM THEREFOR
Raymond L. Freas, 1012 Maple St., Conshohocken, Pa.
Filed June 5, 1950, Ser. No. 166,183
13 Claims. (Cl. 317—158)
(Granted under Title 35, U.S. Code (1952), sec. 266)

This invention described herein may be manufactured and used by or for the Government of the United States of America for governmental purposes without the payment of any royalties thereon or therefor.

This invention pertains to the art of electrical coils, and particularly to the art of high-powered coils which generate heat to an extent that may cause injury to the coil or to nearby persons or surrounding equipment. The invention comprises structure for dissipating heat generated by an electrical coil.

The invention is embodied in novel coil construction, and also in a housing for the coil which constitutes a duct for the flow of fluid which carries away heat generated by the coil.

The apparatus of the disclosed embodiment of the invention is particularly adapted to detonate explosive mines such as are commonly employed in military operations, one type for example of which is deposited in a body of water suspended below the surface thereof. Pursuant to this purpose, the coil of the disclosed embodiment is mounted on an aircraft by means of which it is flown over a mine field on its intended mission of detonating mines.

Figure 2:
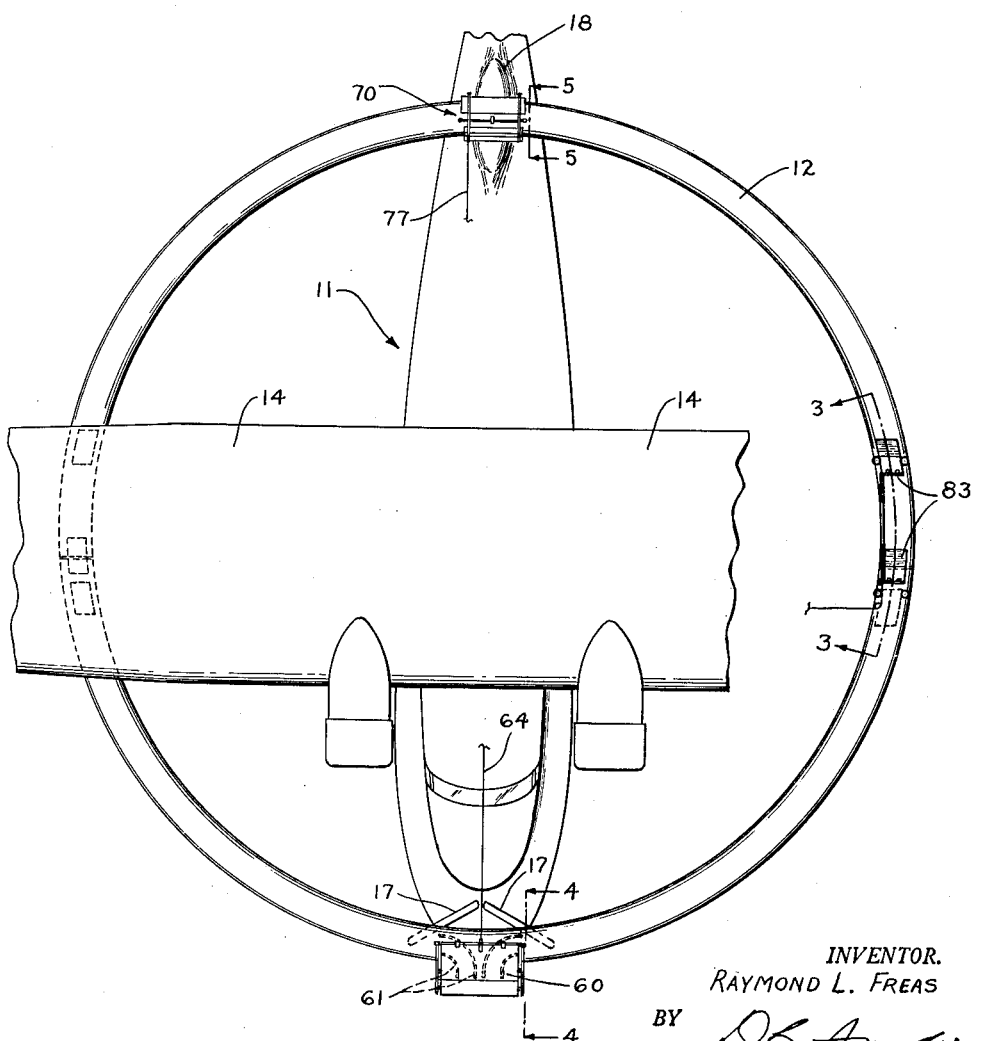
Figure 8:
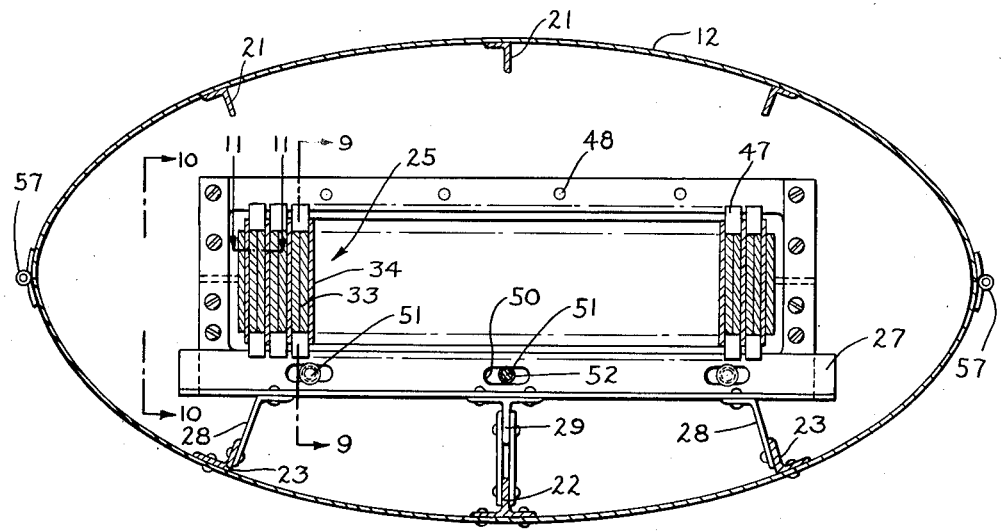
Figure 7:
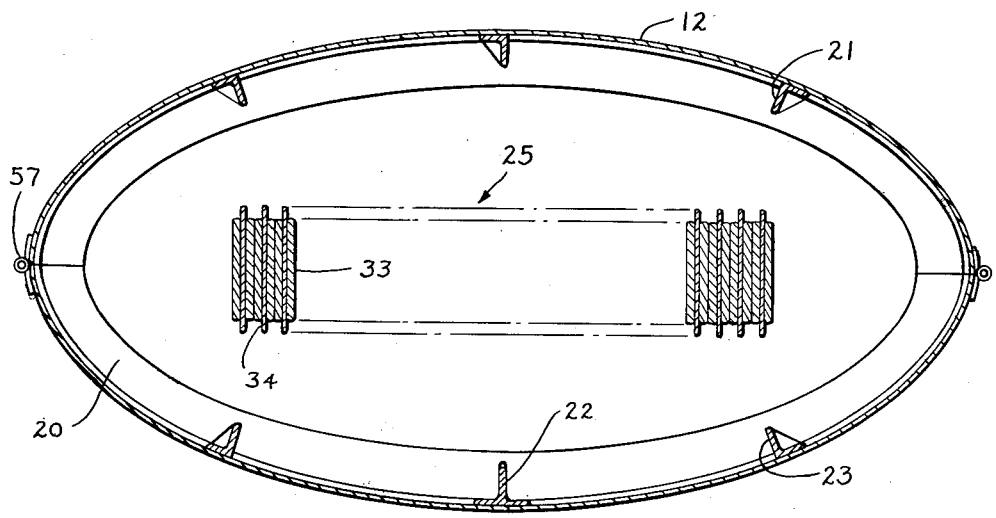
Figure 11:
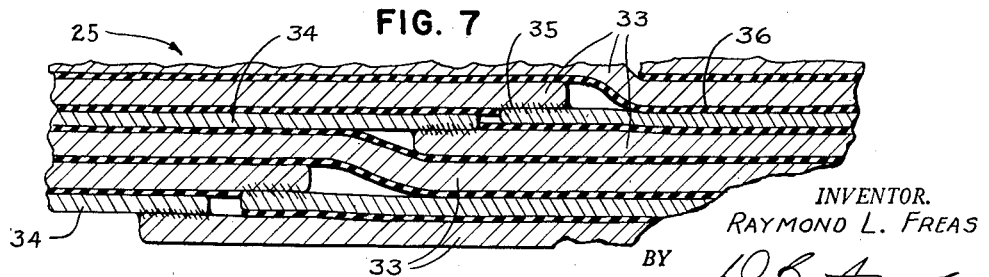

One practical embodiment of the invention is disclosed in the accompanying drawings, to which attention is now directed. In the drawings:

FIG. 1 is a perspective of a device embodying the present invention, as it appears mounted on an airplane in flight, FIG. 2 is a plan of the airplane of FIG. 1, with parts broken away for clearance of illustration, FIG. 3 is a cross-sectional elevation, taken on line 3—3 of FIG. 2, FIG. 4 is a cross-sectional elevation, taken on line 4—4 of FIG. 2, with parts broken away for clearness of illustration, FIG. 5 is a cross-sectional elevation, taken on line 5—5 of FIG. 2, with parts broken away for clearness of illustration, FIG. 6 is a fragmentary elevation, illustrating a detail of the duct construction, FIG. 7 is a cross-sectional elevation, taken on line 7—7 of FIG. 3, FIG. 8 is a cross-sectional elevation, taken on line 8—8 of FIG. 3, FIG. 9 is a cross-sectional elevation, taken on line 9—9 of FIG. 8, FIG. 10 is a detailed end elevation, viewed as indicated by line 10—10 of FIG. 8, and FIG. 11 is a fragmentary cross-sectional plan, illustrating construction of the coil in detail, the view being taken on line 11—11 of FIG. 8.

In the disclosed practical application of the invention, a coil embodying the present invention is carried by an aircraft, such as the airplane 11, FIGS. 1 and 2, and is contained in an annular housing 12.

The housing 12 is attached to the airplane 11 exteriorly thereof in any suitable manner. In the disclosure, the housing 12 hangs suspended under the wings 14 of the airplane, and rods 15 are provided to attach and secure the housing 12 to the underside of the wings 14. In an airplane of the particular type shown, in which the fuselage 16 is suspended under the wings, the housing 12 can be positioned above and rest on the fuselage 16 as shown. At the forward end of the aircraft 11, the duct 12 is attached rigidly to the front end of the fuselage 16 by means of the support rods or brackets 17. Rearwardly of the fuselage 16, the faring 18 is provided as a base on which the housing 12 rests. See FIG. 5.

The housing 12 comprises a tube or duct. The duct 12 is stiffened transversely with internal reinforcements 20, FIG. 3, arranged at intervals circumferentially, and is additionally reinforced lengthwise by means of the upper ribs 21, FIGS. 7 and 8, and the lower center and side ribs 22 and 23, respectively.

The coil 25 is of annular construction and the duct 12 is made correspondingly annular to cover or house the coil 25. The coil 25 rests on its side, and is supported inside the duct 12 centrally of its cross-section. See FIGS. 7 and 8.

The supporting structure for the coil 25 comprises the supports illustrated generally at 26, which are positioned at annular intervals that are suitable to inhibit sagging of the coil. See FIG. 3. Each support 26 comprises a pair of angle pieces 27, which rest on the respective end and center brackets 28 and 29, the angle pieces 27 being secured to the brackets 28 and 29 by any suitable means such as rivets. The pair of angle pieces 27 of each support 26 forms a channel, as seen in FIGS. 9 and 10. Support brackets 29 are secured to the lower lengthwise center rib 22, and brackets 28 are secured each to a side rib 23, by rivets or the like suitable means. The pair of angle pieces 27 of each support 26 extends transversely of the convolutions or cross-section of the coil 25 and, because the coil is circular, the pairs of angle pieces 27 provide a guide channel that is directed radially of the circle of the coil.

The coil 25 comprises a succession of convolutions of flat metal strip wound annularly, the metal having suitable properties of electrical conductivity. Aluminum is employed in the disclosed embodiment principally because of its light-weight. For the purpose of detonating mines electromagnetically, the coil is exceptionally highpowered electrically, and for this reason the coil has a tendency to generate heat to an excessive extent. The invention is not, however, limited to the art of detonating mines, and the invention is not limited to the precise electrical characteristics of the coil. The present invention is directed to a structure that inhibits overheating of the electrical coil.

The coil is wound spirally of strip metal with a cross-sectional area suitable for the desired electrical characteristics. Strip 33 is wide enough to support its own weight when resting on its edge, and to span the space between adjacent supports 26 without sagging. The thickness of the strip is determined accordingly to provide the optimum cross-sectional area for the desired electrical characteristics.

Convolutions of wider strip 34 are alternated with convolutions of strip 33 which is narrower, the thickness of strip 34 being reduced correspondingly to provide a cross-sectional area that corresponds with strip 33. The wider strips 34 overlap beyond the side edges of adjacent narrower strips 33, and this provides extended areas of exposed surfaces available for heat transfer.

In the specific construction of the disclosure, see FIG. 11 particularly, strip 33 is wound to form two adjacent convolutions, and strip 34 is wound to form a single convolution next adjacent thereto, the strip 34 being followed by an additional strip 33 that is wound to form two convolutions. This construction of two convolutions of narrower strip 33 alternating with a single convolution of wiper strip 34 is continuous throughout the extent of the coil, and is continued until a coil of the desired total number of turns or convolutions is completed. Where adjacent ends of strips 33 and 34 meet, they are electrically connected to each other, for example by the lap welds 35. The welds 35 are staggered around the annulus of the coil 25 to avoid different welds 35 being adjacent each other. By staggering the welds 35, they become arranged spirally of the annulus of coil 25.

Suitable insulation is provided between opposed faces of adjacent convolutions and this, in the disclosed embodiment, comprises strips 36 of insulating material of suitable thickness for the purpose positioned between adjacent convolutions. Whenever a convolution is formed, a strip 36 of insulating material is attached to the exposed surface thereof, by means of any suitable adhesive, and the next convolutions of metal strip 33 or 34 is positioned against the exposed face of the insulating strip 36.

When the coil 25 is completely wound, it is bound and secured in wound condition by a device comprising a plurality of bands or straps illustrated generally at 40. The bands 40 are arranged at intervals annularly of the coil 25, the intervals of the bands 40 being coincident with the supports 26. Each strap 40 is positioned along the coil at a support 26 and operates companion thereto.

Each band 40 comprises a set of blocks of insulating material that are contoured to fit around the convolutions of the coil 25, there being a top block 41 and a bottom block 42 in each set of blocks in the disclosed embodiment. Reinforcements for blocks 41 and 42 comprise the respective envelopes 43 and 44 of sheet metal. Blocks 41 and 42 fit into their respective envelopes 43 and 44, are covered thereby and are held in place by rivets 48. At their ends the reinforcements 43 and 44 are formed to overlap each other as seen at 45, FIGS. 10 and 9. Fasteners 46 serve to attach the envelopes 43 and 44 rigidly to each other and for holding the blocks in clamping engagement with the coil 25, which is thereby secured in wound condition. Bolts are employed as fasteners 46 and they are extended through envelopes 43 and 44 and through respective blocks 41 and 42 contained therein in the manner shown.

On their inside surfaces that engage the coil, the blocks 41 and 42 are contoured to fit against and into engagement with the outer surface of coil 25, and the blocks 41 and 42 thus press against the opposite edges of the strips 33 and 34, being held firmly in clamping engagement therewith by means of the fasteners 46. The inside pressure surfaces of blocks 41 and 42 are preferably flat, and they thus contact the edges of wider strips 34 only. The blocks 41 and 42 are therefore supplemented with inserts or fillers 47 to conform their contours to the irregular contouring of the coil 25 incident to the wider strips 34 overhanging the narrower strips 33. Inserts 47 are of insulating material and are positioned between adjacent convolutions of strips 34 to fill the spaces beyond the edges of intermediate narrower strips 33. Thus the inside surface of each block 41 and 42 presses against the edges of strips 33 and 34 throughout their extent and the two blocks press opposed to each other against opposite surfaces of the coil 25 formed by the side edges of strips 34 and 33 to the full extent of the coil. This continuous pressure throughout the extent of the coil 25 operates to hold all convolutions firmly in proper position relative to each other.

Each band or strap 40 rests on its companion support 26, and is made to fit in the channel of its support formed by the pair of angle pieces 27, and is movable along the channel. The angle pieces 27 are provided with elongated holes or slots 50. Bolts 51 are extended through the lower block 42 and the envelope 44 thereof, and also through the slots 50, and the weight of the coil 25 rests on the bolts 51 through the blocks 40 mounted on their respective supports 26. Each bolt 51 is provided with sleeves 52 which fit in the slots 50 and serve as rollers for easy movement of the bands 40 along their supports 26 guided by the slots formed by pairs of angle pieces 27. This allows for thermal expansion and contraction of the coil 25, the movement being radial in the disclosed construction of the coil being circular.

The duct 12 is preferably constructed of top and bottom sections 55 and 56 which are parted along the median plane of duct 12, top and bottom sections being detachably attached to each other. Brackets 57 are provided at intervals annularly of the duct 12, there being companion brackets 57 along adjacent edges of top and bottom sections 55 and 56 positioned coincidently to interlock each other. See FIG. 6. A removable retaining pin 58 attaches each set of companion brackets 57 to each other and the top and bottom sections 55 and 56 are thereby secured to each other to close the duct 12. Each retaining pin 58 is secured against becoming detached from its set of brackets 57, by means of the cotter pin 59 for example.

The intake 60, FIGS. 1 and 2, is positioned at part of duct 12 that is forward with reference to the aircraft 11. Air intake 60 extends outwardly from the annulus of duct 12 in the forwardly direction, FIG. 4, and it comprises a passage through the forward wall of the duct. Guide vanes 61, see also FIG. 2, direct the flow of air that enters the passage of inlet 60 to the right and left along the two legs of the duct 12. Door 62 enables the passage 60 to be closed, or to be opened any desired extent for control of the amount of air that enters the duct 12. The door 62 comprises the centrally located pivot 63 on which it swings to open or closed position. Control leads 64 extend to and into the fuselage 16 to any position therein convenient for their operation. The control leads 64 are connected to the door 62 for its operation by means of any suitable mechanism, the lever 65 attached to the pivot 63 of the door and the linkage illustrated generally at 66 being the connecting mechanism of the disclosed embodiment.

The after exhaust 70 is positioned at the part of the duct 12 that is rearwardly of the aircraft and opposite the intake 60. Exhaust 70 comprises an outlet passage 71 through the wall of the duct 12 directed outwardly of the annulus and in a rearwardly direction thereof. The exhaust 70 also includes a draft-inducing inlet 72 through the wall of the duct 12 directed inwardly of the annulus thereof and in a forward direction in line with the outlet passage 71. The outlet passage 71 is provided with the door 73 which is pivoted at 74. The draft-inducing inlet 72 is also provided with a door 75, pivoted at 76. Control leads 77 extend from the exhaust 70 into the fuselage 16 to any position therein convenient for their operation. Linkage generally indicated at 78 is connected to the door 73 through its lever 79, and also to the door 75 through lever 80 attached to its pivot 76. The control leads 77 are connected to the linkage 78 for operating both doors 73 and 75 of the after exhaust 70 simultaneously.

Air flows out of the duct 12 through the outlet passage 71 of the after exhaust 70 by the airplane 11 being in flight when the doors 73 and 75 are open.

To keep the temperature of the coil 25 more uniform throughout its annular extent, one or more auxiliary air intakes 83, FIG. 2, are provided at intervals along the duct of housing 12. In the disclosed embodiment, there is an auxiliary air intake 83 in each leg of the housing 12 between the forward intake 60 and the after exhaust 70, the auxiliary air intakes 83 thus being proximate to the respective wings 14 of the airplane 11.

The auxiliary intakes 83 each comprises the inlets 84 and 85, FIG. 3, spaced apart from each other along the duct 12. Each inlet 84 and 85 is provided with a door 86 and 87 respectively, pivoted at 88 and 89 respectively. Sets of control leads 90 extend to and into the fuselage 16 to any position therein convenient for their operation. Linkage 91 connects the levers 92 and 93 attached to the respective levers 88 and 89, and a set of leads 90 is connected to each linkage 91 through its lever 92 for operating the doors 86 and 87 to open or closed condition as desired.

An auxiliary exhaust or outlet 95 is positioned immediately forwardly of each auxiliary intake 83 to exhaust air that entered duct 12 through intake 60 and which has become heated by passage through the duct. Aft of each auxiliary exhaust 95 a baffle 96 is provided to close off the passage of duct 12 and prevent air which has become heated by passage through the duct 12 towards the exhaust 95 from entering the stream of cool air that is supplied by the proximate auxiliary intake 83. The outlet 95 is directed downwardly as shown, and the intake 83 is along the top surface of duct 12, so that the heated air leaving the exhaust 95 does not enter the adjacent intake 83.

The coil 25 of the disclosed embodiment is adapted to be operated only when the airplane 11 is in flight. Thus, the coolant fluid used in the practical embodiment of the disclosure is blown through the duct 12 by the flight of the airplane 11. Whenever operation of the coil 25 generates so much heat that dangerously high temperatures are attained, air is caused to flow through the duct 12 to cool the coil, the doors 62, 73, 75, 86 and 87 being opened each to the extent required for the particular temperature control demanded by whatever conditions occur. Air flows into the duct 12 at the front through inlet passage 60, and by the vanes 61 is directed to the right and left along the respective legs of the duct, and this air is exhausted through the auxiliary outlet 95. A fresh supply of cool air enters the duct 12 through inlets 84 and 85 of each auxiliary intake 83, and it flows along the duct and leaves the duct through the after exhaust 70.

Air that flows along each leg of the duct 12 carries with it heat from the surface of the coil 25. The extended outside surface of the coil 25 incident to the structure of alternated narrow and wider convolutions 33 and 34 respectively improves the heat transfer from the coil to the passing air.

Air that enters the main intake 60 is heated during its passage along the duct 12 towards the auxiliary exhaust 95 by contact with the coil 25, and the position of the auxiliary exhaust 95 and the auxiliary intake 83 with reference to the main intake 60 is determined to prevent the coil 25 from becoming overheated to a dangerously high magnitude at any point along its annular extent. Air that enters the auxiliary intake 83 picks up heat from the coil 25 by its passage through duct 12, and the heated air is exhausted through the outlet passage 71 of the after exhaust 70.

Any suitable temperature measuring apparatus may be provided, if desired and positioned anywhere annularly of the coil where critical temperatures are likely to occur, but these form no part of the present invention.

The accompanying disclosure is of one practical embodiment of the invention, the scope of which is not limited thereby, however. The scope of the invention is determined by the accompanying claims, to which attention is now directed.

I claim:

1. An electrical coil comprising a plurality of convolutions of flat strip metal wound annularly with wide faces of successive convolutions disposed face-to-face, a device for holding the coil in wound condition comprising bands arranged at intervals annularly of the coil, each band comprising a set of blocks of insulating material contoured to fit around the convolutions, reinforcements for the band comprising an envelope for each block of a set of blocks, fasteners for each band attaching the envelopes of the bands to each other to hold the blocks of the band in clamping engagement with the coil and secure the coil in wound condition.

2. In an electrical coil as defined in claim 1, the several convolutions of the coil comprising wider and narrower strips alternated, the wider strips extending widthwise beyond the edges of the narrower strips, each band comprising a set of blocks of insulating material contoured to fit each against the edges of adjacent strips on one side and severally positioned opposed to each other against respective opposite edges of the strips, the fasteners holding the blocks of a set in clamping engagement with the coil along respective opposite edges of the strips.

3. An electrical coil adapted to rest on its side and comprising a plurality of convolutions of flat strip metal wound annularly with wide faces of successive convolutions disposed face-to-face, a device for holding the coil in wound condition comprising bands around the convolutions and arranged at intervals annularly of the coil, the strip material of each convolution being wide enough to support its own weight and intervals between adjacent bands being near enough to inhibit sagging of the coil, a support structure for the coil comprising supports disposed annularly of the coil at intervals corresponding with the bands, each support comprising a rest constituting a channel directed transversely of the convolutions of the coil in position for its companion band to rest in the channel and move along it.

4. In a coil as defined in claim 3, rollers in each channel, each band bearing on the rollers of its channel for movement along the channel.

5. An electrical coil adapted to rest on its side and comprising a plurality of convolutions of flat strip metal wound annularly with wide faces of successive convolutions disposed face-to-face, a device for holding the coil in wound condition comprising bands arranged at intervals annularly of the coil, the strip material of each convolution being wide enough to support its own weight and intervals between adjacent bands being near enough to inhibit sagging of the coil, each band comprising a top and bottom block of insulating material contoured to fit around the convolutions and respectively engaging opposite edges of the strip metal, reinforcements for the bands comprising an envelope for each block, fasteners attaching the envelopes of each band to each other to hold the blocks in clamping engagement with the coil and secure the coil in wound condition, the reinforcement of each band holding the top and bottom blocks thereof pressed against respectively opposite edges of the strips.

6. In a coil as defined in claim 5, the several convolutions comprising wider and narrower strips alternated, the wider strips overlapping beyond the edges of adjacent narrower strips, each band comprising inserts of insulating material between adjacent wider strips filling the space beyond the edges of intermediate narrower strips for the blocks to press against opposite edges of the narrower strips.

7. In a coil as defined in claim 5, a support structure for the coil comprising supports disposed annularly of the coil at intervals coinciding with the bands, each support comprising a rest disposed transversely of the convolutions of the coil in position for its companion band to rest upon it.

8. In electrical apparatus embodying an annular coil, a housing correspondingly annular and comprising a tube containing the coil, a support for the coil within the housing holding the coil at the center of the tube, the housing comprising an intake and an exhaust annularly opposite each other for the flow of cooling fluid through the tube, the intake and the exhaust each comprising a passage through the wall of the tube extending exteriorly away from the annulus of the housing, a fluid outlet through the wall of the tube in each leg of the housing between the intake and exhaust, a fluid inlet proximate to each outlet.

9. In an electrical apparatus, a coil comprising convolutions of flat strip metal wound annularly and spirally with wide faces of successive convolutions disposed face-to-face, a housing correspondingly annular and comprising a tube containing the coil, a support for the coil within the housing holding the coil at the center of the tube, the housing comprising an intake and an exhaust annularly opposite each other for the flow of cooling fluid through the tube.

10. In electrical apparatus as defined in claim 9, the several convolutions comprising wider and narrower strips alternated, the wider strips extending widthwise beyond the edges of the narrower strips.

11. In an electrical apparatus as defined in claim 8, proximate inlets and outlets being located respectively in opposite walls of the tube.

12. In an annular electrical coil, convolutions wound around an axis of the coil and having greater dimensions transversely of the coil than axially, a device for holding the coil in wound condition comprising bands arranged at intervals annularly of the coil, each band extending around the convolutions of the coil and binding the convolutions in wound position, a support structure comprising a plurality of supports at the annulus and disposed at intervals annularly corresponding with the bands, each support consisting of a rest on which the corresponding band bears freely and extending transversely of the convolutions of the coil, each rest extending transversely of the axis of the coil sufficiently for movement of the coil along the rest towards and away from its axis in response to thermal contraction and expansion respectively of the coil.

13. In a coil as defined in claim 12, the annulus of the coil being circular.

References Cited in the file of this patent

UNITED STATES PATENTS

| | | |
|---|---|---|
| 753,461 | Anderson | Mar. 1, 1904 |
| 1,224,225 | Sieber | May 1, 1917 |
| 1,535,859 | Roothaan | Apr. 28, 1925 |
| 1,548,857 | Steinberger | Aug. 11, 1925 |
| 1,555,954 | Steinberger | Oct. 6, 1925 |
| 1,621,456 | Brown | Mar. 15, 1927 |
| 1,680,783 | Gutzmann | Aug. 14, 1928 |
| 1,747,953 | Roothaan | Feb. 18, 1930 |
| 1,815,707 | Gerth | July 21, 1931 |
| 1,861,869 | Long | June 7, 1932 |
| 2,318,859 | Huguelet | May 11, 1943 |
| 2,347,063 | Pollard et al. | Apr. 18, 1944 |
| 2,387,947 | Sauer | Oct. 30, 1945 |
| 2,467,377 | Giegerich | Apr. 19, 1949 |
| 2,467,804 | Beymer | Apr. 19, 1949 |
| 2,561,738 | Hill | July 24, 1951 |

OTHER REFERENCES

Article: "Work of Mine-Killing Bombers Revealed in British Booklet," Richmond Times-Dispatch, January 14, 1943.